(12) United States Patent
Gauron

(10) Patent No.: US 6,918,725 B2
(45) Date of Patent: Jul. 19, 2005

(54) CLIP NUTS WITH PLASTIC CLIPS

(75) Inventor: Jacques Gauron, Issaquah, WA (US)

(73) Assignee: Marketing Masters, Inc., Issaquah, WA (US)

( * ) Notice: Subject to any disclaimer, the term of this patent is extended or adjusted under 35 U.S.C. 154(b) by 0 days.

(21) Appl. No.: 10/192,662

(22) Filed: Jul. 9, 2002

(65) Prior Publication Data

US 2002/0182027 A1 Dec. 5, 2002

Related U.S. Application Data

(63) Continuation-in-part of application No. 09/794,986, filed on Feb. 27, 2001, now Pat. No. 6,474,917.
(60) Provisional application No. 60/213,302, filed on Jun. 22, 2000.

(51) Int. Cl.[7] .............................................. F16B 39/284
(52) U.S. Cl. ....................................... 411/112; 411/172
(58) Field of Search ................................. 411/174, 175, 411/112, 103, 148, 166, 111, 172

(56) References Cited

U.S. PATENT DOCUMENTS

| | | | | |
|---|---|---|---|---|
| 3,478,801 A | * | 11/1969 | Van Niel | 411/112 |
| 3,765,078 A | * | 10/1973 | Gulistan | 29/432 |
| 4,219,064 A | * | 8/1980 | Lozano | 411/103 |
| 4,902,180 A | * | 2/1990 | Gauron | 411/82.1 |
| 5,193,868 A | * | 3/1993 | O'Toole | 292/341.15 |
| 6,474,917 B2 | * | 11/2002 | Gauron | 411/112 |

FOREIGN PATENT DOCUMENTS

| | | | | |
|---|---|---|---|---|
| AU | 0285927 | * | 9/1968 | ................. 411/112 |
| GB | 2041138 A | * | 9/1980 | ........... F16B/37/04 |

* cited by examiner

*Primary Examiner*—William L. Miller
(74) *Attorney, Agent, or Firm*—Delbert J Barnard

(57) ABSTRACT

A metal nut (N) is held by a plastic clip-body (12). The clip-body (12) has first and second arms (16, 18) and an end wall (20) that form a closed end and an open end (6). The open end (60) includes cam surfaces for camming a member (M) into the open end (60). It also includes an annular locator wall (28) that extends upwardly from the second arm (18). The upper end of this locator wall is formed to slope upwardly as it extends inwardly from the open end of the clip-body (12). The sloping upper end of the locator wall (28) helps to cam the member (M) into the clip-body (12). The clip-body (12) includes a first arm (16) having sidewalls (36, 38) that extend outwardly from the arm (16).

9 Claims, 4 Drawing Sheets

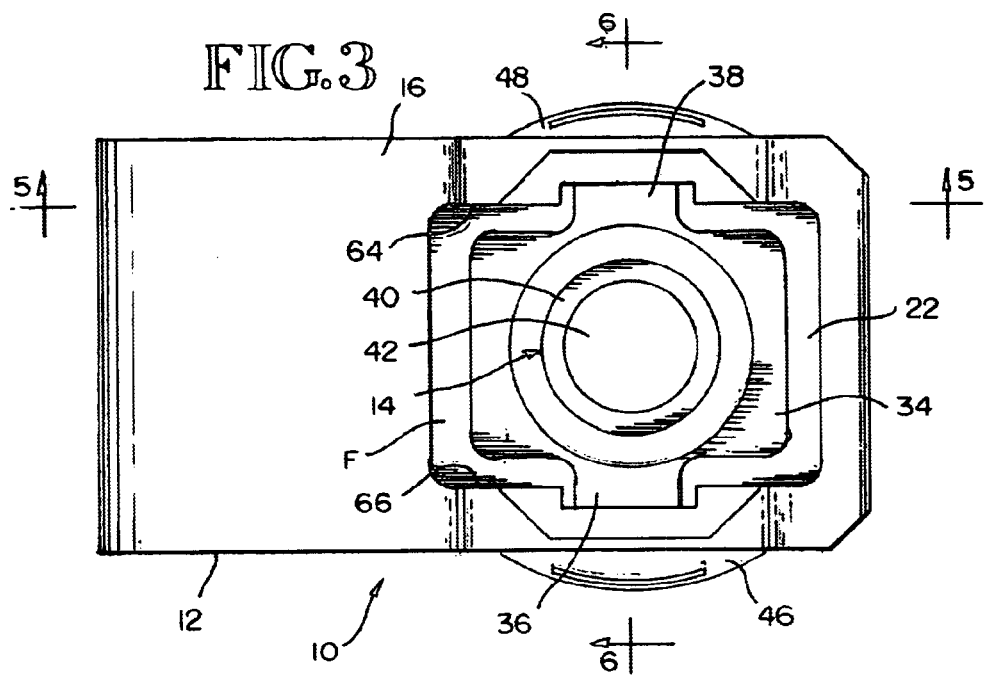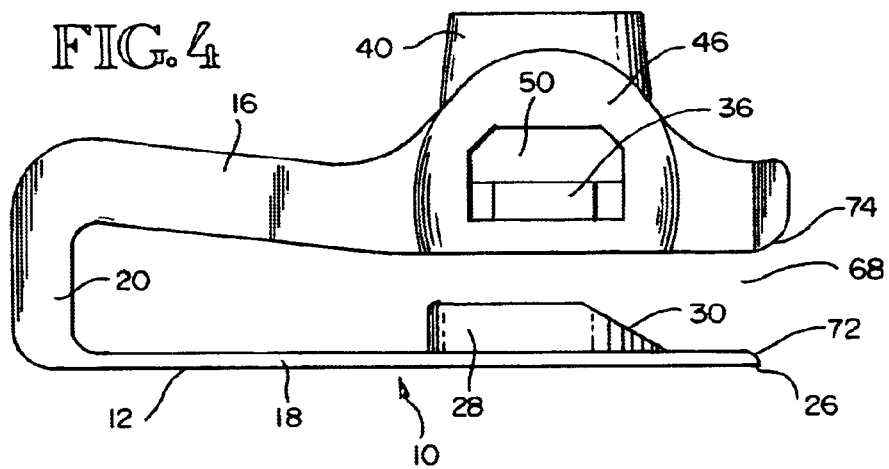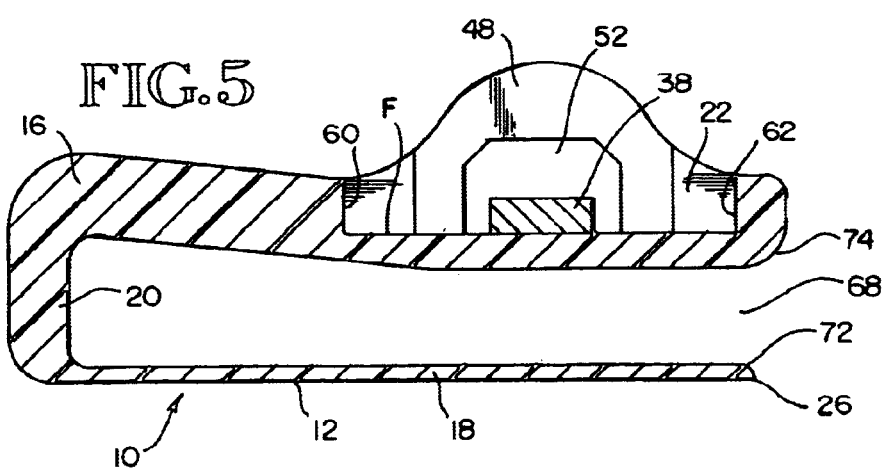

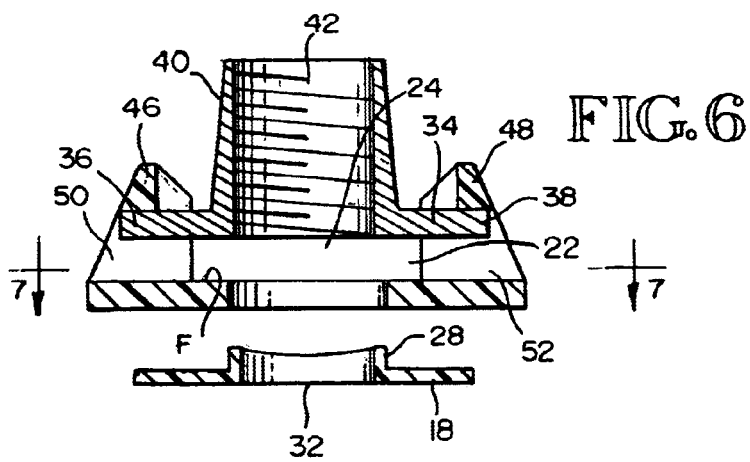
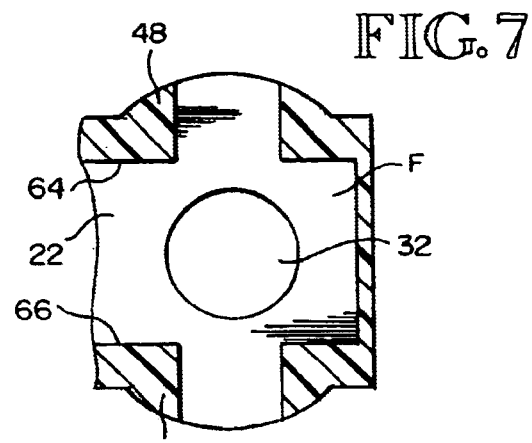
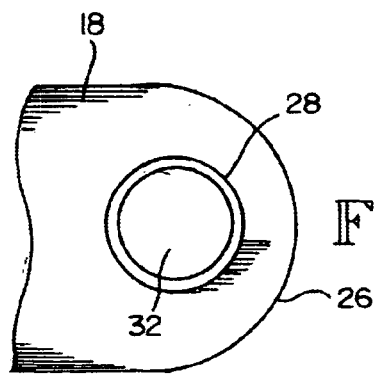
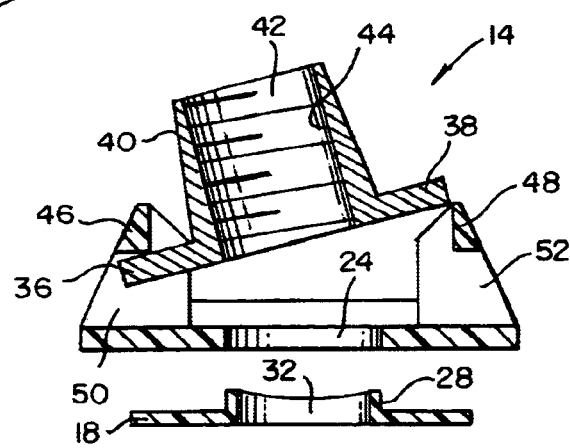

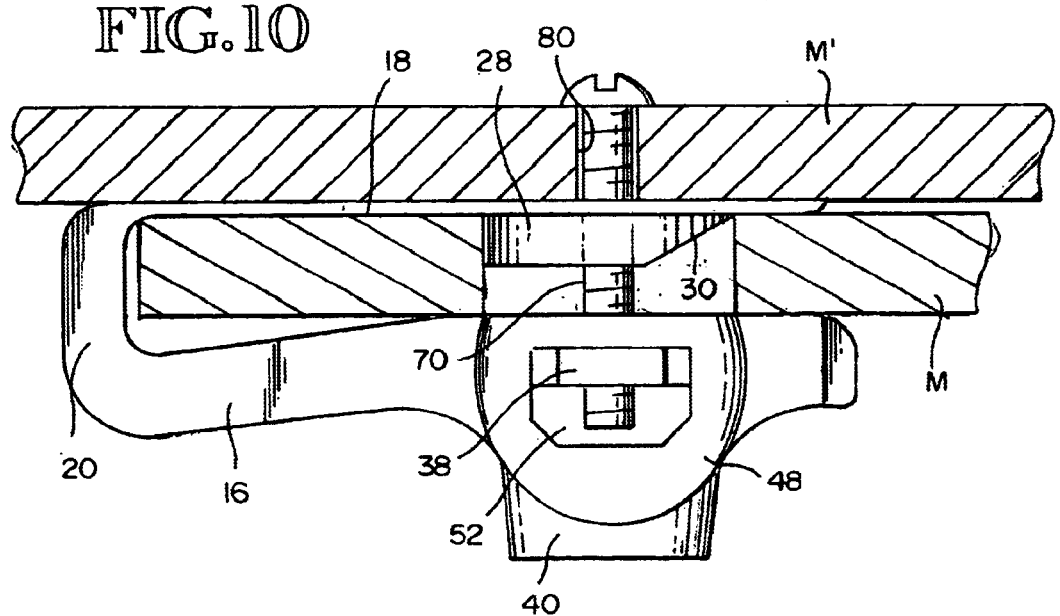
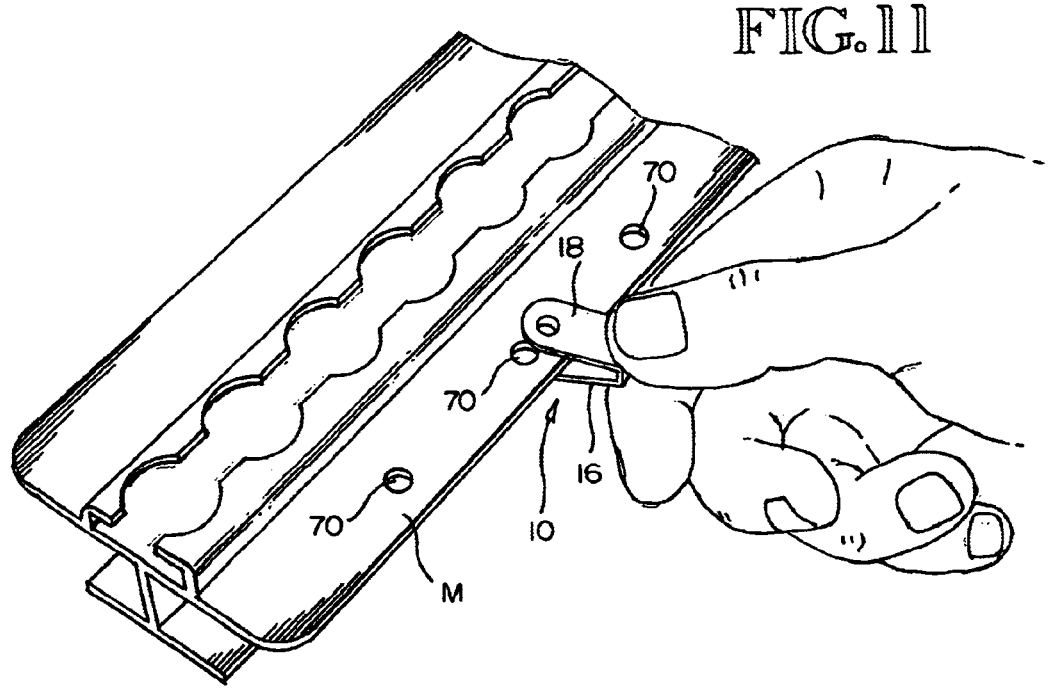

CLIP NUTS WITH PLASTIC CLIPS

RELATED APPLICATION

This application is a continuation-in-part of my application Ser. No. 09/794,986 filed Feb. 27, 2001, and entitled Clip Nuts, now U.S. Pat. No. 6,474,917. Ser. No. 09/794,986 and this application claim priority to provisional application Ser. No. 60/213,302, filed Jun. 22, 2000, and also entitled Clip Nuts.

TECHNICAL FIELD

The present invention relates to improvements in clip nuts. More particularly, it relates to the provision of clip nuts that are simple in design, are capable of being mass-produced in an economical manner, and which will not scratch the surfaces or contribute to any corrosion of a metal member upon which they are installed.

BACKGROUND OF THE INVENTION

Clip nuts are adapted to clip onto a first member to which a second member is to be joined by use of a connector bolt or screw that extends through openings in the two members and screws into the clip nut. An example clip nut is disclosed by U.S. Pat. No. 4,219,064, granted Aug. 26, 1990, to Anthony H. Lozano, and assigned to the Shur-Lok Corporation of Irvine, Calif. This patent and the patent publications referred to in it provide an adequate background to this invention and are thus hereby incorporated herein for that purpose.

There is a need for an easy to manufacture clip nut that will not mar the surfaces of the member on which the clip nut is installed. An object of the present invention is to provide such a clip nut.

BRIEF SUMMARY OF THE INVENTION

The present invention provides a clip nut having a plastic clip body that is easy to install onto an edge portion of a panel and which is constructed to minimize the scratching or marring of the surfaces of the panel.

An object of the invention is to provide a clip nut having a plastic clip-body and a metal nut secured to the body in a manner permitting the nut to float in an amount sufficient to make it easy to insert a bolt into the nut. The plastic body is constructed to adequately brace the metal nut and prevent it from turning while the screw is being screwed into the metal nut.

Clip nuts of the present invention are basically characterized by a plastic clip-body that includes a first arm having first and second ends, a second arm having first and second ends, and an end wall connecting the second end of the first arm to the second end of the second arm. This forms a closed first end for the clip-body. The opposite, second end of the clip-body is open. The first arm includes a pair of sidewalls on opposite sides of the first arm. The sidewalls include a pair of substantially aligned ear openings. A pair of substantially aligned bolt openings are provided in the first ends of the first and second arms. The first arm is formed to include an outwardly directed nut well in its first end, at a location laterally between the sidewalls. The nut well includes a floor and a pair of laterally extending end walls. The end walls form a pair of laterally extending fences. The clip nut also includes a nut having a base and a tubular body that extends away from the base. The tubular body includes an internally threaded central opening. The base includes a pair of opposite end edges, a pair of opposite side edges, and a pair of ears that extend laterally outwardly of the base and into the ear openings. The end edges of the base of the nut are substantially parallel to the fences. The length of the base of the nut between the end edges is smaller than the distance between the two fences.

Preferably, the nut well floor includes side portions which extend laterally outwardly through the ear openings. The sidewalls of the first arm have inner surfaces that extend upwardly from the nut wall floor. The nut base has side edges that confront these inner surfaces.

According to an aspect of the invention, when the nut base is on the nut well floor and the ears are in the ear openings, the nut is free to float in the nut well so that the internally threaded opening in the tubular body of the nut can become substantially aligned with the bolt openings in the first ends of the first and second arms of the clip-body.

Preferably, the nut base and the nut well are dimensioned such that edge portions of the nut base will contact wall portions of the nut well and stop the nut from rotating in response to torque forces applied to the nut by inserting a bolt into the nut and tightening the bolt in the nut.

According to another aspect of the invention, the end wall and the first arm are thicker than the second arm and are thick enough to carry torque forces that are applied to the clip nut when a bolt is tightened in the nut. The second arm has inner and outer surfaces and preferably has a beveled edge at the open end of the clip-body that slopes upwardly and inwardly from the outer surface to the inner surface of the second arm.

In preferred form, the opening in the first end of the second arm is at least partially surrounded by a tubular wall that projects from the inner surface of the second arm towards the first arm. The tubular wall has a sloping end portion that is directed outwardly towards the open end of the clip body. This end portion slopes upwardly and inwardly from the inner surface of the second arm. The first arm has inner and outer surfaces and preferably also has an endwise outwardly directed flared end portion at the open end of the clip-body.

In preferred form, the ear openings are axially elongated and have side surfaces that confront side edges on the ears. The nut well has a floor that includes floor portions that extend outwardly through the ear openings.

The clip-bodies are made from Torlon™ or an equivalent structural plastic material.

Objects, advantages and features of the invention will become apparent from the description set forth below, from the drawings, and from the principles that are embodied in the specific structures that are illustrated and described.

BRIEF DESCRIPTION OF THE SEVERAL VIEWS OF THE DRAWINGS

Like reference numerals and letters refer to like parts throughout the several views of the drawing, and:

FIG. 3 is a top plan view of the clip nut shown by FIGS. 1 and 2;

FIG. 4 is a side elevational view of the clip nut shown by FIGS. 1–3;

FIG. 5 is a longitudinal sectional view taken substantially along line 5—5 of FIG. 3;

FIG. 6 is a cross-sectional view taken substantially along line 6—6 of FIG. 3;

FIG. 7 is a sectional view taken substantially along line 7—7 of FIG. 6;

FIG. 8 is a sectional view taken substantially along line 8—8 of FIG. 6;

FIG. 9 is a view like FIG. 6, but showing the nut in the process of being inserted into the clip-body;

FIG. 10 is a sectional view taken through two members that are to be connected together by the clip nut, such view presenting a side elevational view of the clip nut installed; and FIG. 11 is a pictorial view showing the clip-body being installed onto a seat track flange region that is used in an airplane.

DETAILED DESCRIPTION OF THE PREFERRED EMBODIMENT

The various concepts or principles which make up the invention can be best understood by considering the following description of example embodiments of the invention.

Figure 1:
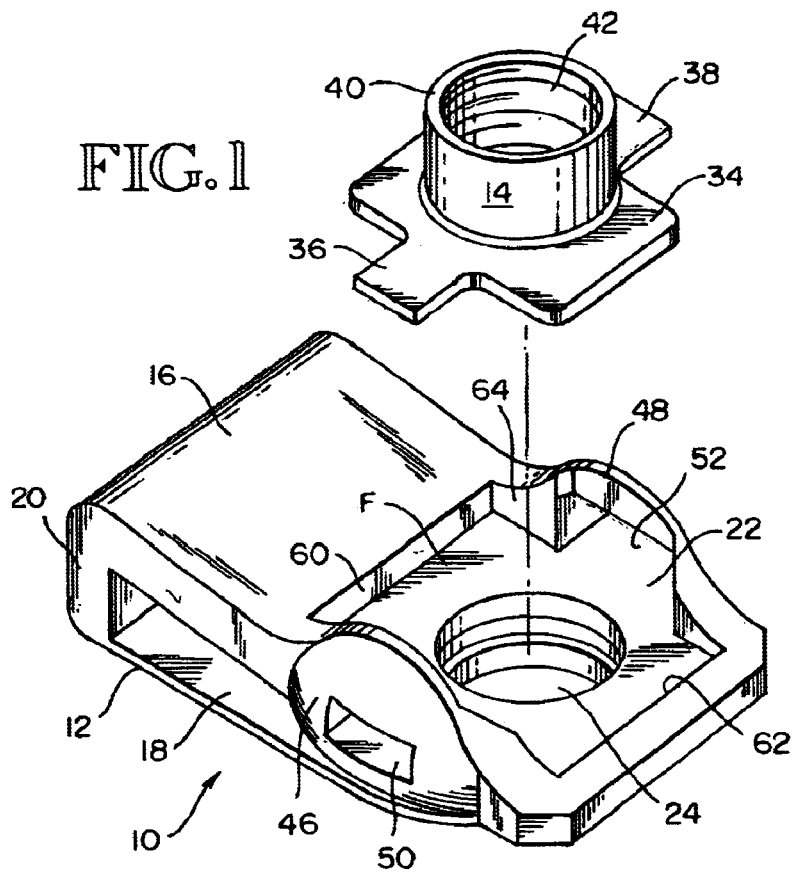
FIG. 1 is a pictorial view of a clip nut that incorporates the present invention, such view showing a metal nut spaced upwardly from the position that it occupies on the clip-body.

Referring to FIGS. 1–6, the clip nut 10 comprises a plastic clip body 12, constructed from a structural plastic, and a metal nut member 14. Plastic clip body 12 comprises a first arm 16 connected to a second arm 18 by an end wall or bight portion 20. Arm 16 is substantially thicker than arm 18 and is preferably also thicker than end wall 20. As best shown by FIG. 1, arm 16 includes a socket-like nut well 22 having a substantially flat floor F. Arm 16 also includes a through opening 24 in the floor of the well 22. As best shown by FIG. 8 arm 18 includes a rounded end 26 and an annular alignment flange 28 that projects from arm 18 towards the opening 24 in arm 16. End 26 may have a substantially circular curvature. Flange 28 includes a sloping end surface 30 (FIG. 4) and a circular center opening 32 (FIG. 7). The diameter of opening 24 is larger than the outside diameter of the annular flange 28. This allows the arm 16 to move relatively towards the arm 18 without there being contact between the annular flange 28 and the boundary of opening 24 (FIG. 10).

Preferably the plastic clip body 12 of the clip nut 10 is molded or otherwise formed in one piece from Torlon™, or a similar structural plastic material. Torlon™ is both strong and flexible. Torlon™ is disclosed and claimed in U.S. Pat. No. 4,902,180, granted Feb. 20, 1990, to Richard F. Gauron. Torlon™ is manufactured by Amoco Performance Products, Inc. of Ridgefield, Conn. 08677. Torlon™ is a polymer that is tough enough to replace metal. It is highly resistant to wear and fatigue. It is particularly suitable for use in making the plastic clip bodies of the invention because it is both strong and flexible. Most structural plastics are either strong or flexible but not both.

TORLON™ is a reaction product of trimellitic anahydride and aromatic diamines. It is called amide-imide because the polymer chain comprises amide linkages alternating with imide linkages. Amoco Chemicals Corporation claims that (1) the combination of aromatic groups and imide linkages are responsible for the polymer—s exceptional thermo-stability and (2) the amide groups impart flexibility and elongation, which results in an engineering plastic with exceptional toughness.

The metal nut member 14 has a base 34 that may be square or rectangular in plan form, as shown by FIG. 1. Metal nut member 14 is essentially the same as the nut 34 shown in the aforementioned U.S. Pat. No. 4,219,064 but longer to provide more base metal outwardly of the tubular part 28. The base 34 of the metal nut member 14 includes a pair of ears 36, 38 which project in opposite directions from the base 34. An upstanding annular member 40 is connected to the base 34. It includes a center opening 42 that is provided with internal threads 44. The longer base provides nut 14 with a larger footprint in contact with the plastic below it. This guards against the lower edge of part 34 cutting into the plastic when a bolt is tightened in the nut 14.

Arm 16 includes a pair of sidewalls 46, 48 that project upwardly from the arm 16. Sidewalls 46, 48 include ear receiving openings 50, 52. A side elevational view of opening 50 shown by FIG. 4. The opening 52 in sidewall 48 is preferably the same as opening 50 in sidewall 46. referring to FIG. 9, the base 34 of the metal nut member 14 is positioned above the arm 16 and its ear 36 is placed in opening 50. Then the metal nut member 14 is swung towards sidewall 48 until the outer end of ear 38 moves into opening 52. The sidewall 48 is bendable outwardly enough to allow ear 38 to slip downwardly into opening 52. The ears 36, 38 and openings 50, 52 mount the metal nut member 14 so that it can "float" relative to the plastic clip-body 12, both lengthwise and crosswise. The end walls 60, 62 of the well 22 restrain movement of the nut member 34 longitudinally of the clip nut 10. The sidewalls 64, 66 of the well 22 limit sideways movement of the nut 34 within the well 22 (FIG. 3).

Referring to FIGS. 4,5 and 10, an avenue 68 is formed by and between arms 16 and 18. This avenue 68 receives an edge portion of a first member M (FIG. 10). This member M is inserted through avenue 68 between arm 16 and arm 18. This may require the arms 16, 18 to move relatively apart until the member M is between them and an opening 70 in the member M is in alignment with the annular member 28.

Opening 24 is larger in diameter than the outside diameter of the annular member 28. Thus, when annular member 28 is aligned with the opening 24, the annular member 28 quite readily moves into the opening 24 in the member M. When the member M is between the arms 16, 18, one surface of it is in contact with the inner surface of the arm 16.

The sidewalls 46, 48 stiffen the arm 16 and give it a channel shape cross section in the region of the well 22 (FIGS. 6 and 9). The surfaces of the plastic clip body 12 contact the member M when the member M is inserted through the avenue 60. These surfaces are soft and smooth surfaces that will not mar or scratch the material from which the member M is made. Sloping surfaces 72, 74, 30 may help cam the member M into the plastic clip body 12. When the clip nut 10 is installed on to a member M, another member M (FIG. 10) can be moved against arm 16. Then, the threaded shank 78 of a bolt 80 is inserted through openings 32, 24, 70 and is threaded into the threaded opening 44. When this bolt 80 is tightened it will firmly secure the two members M, $M^1$ together. Typical connections of this type, using clip nuts of a different construction, are disclosed by the aforementioned U.S. Pat. No. 4,219,064, and by U.S. Pat. No. 3,670,796, granted Jun. 20, 1972, to David W. Grimm; by U.S. Pat. No. 4,375,933, granted Mar. 8, 1983, to Donald H. Hassler and Paul V. Pagel and by U.S. Pat. No. 4,676,706, granted Jun. 30, 1987, to Akio Inaba.

The edge 26 is flared at 72 and the edge across the opening 68 from edge 26 is flared at 74. More specifically, flared edge 72 slopes upwardly and inwardly as it extends from the outer surface of the arm 18 to the inner surface of the arm 18. The region 74 has a similar shape. The surfaces 72, 74 provide the avenue 68 with a converging or funnel-like entrance. The edge of a member M can be inserted into the avenue 68 and moved into the space between the arms 16, 18. As it moves, its edges contact the surfaces 72, 74 and are cammed by the surfaces 72, 74 into the entrance 68. As the member M moves further into the space between the arms 16, 18, it will contact sloping surface 30. This surface 30 will further cam the edge of the member M into the space between the arms 16, 18.

FIG. 11 shows the clip 10 being placed on a member M that is a flange portion of a seat track in an airplane. In FIG. 11, the member M is between the arms 16, 18, and the surface 30 is in contact with the upper surface of the member M. The clip nut 10 is moved inwardly until the member 28 moves into the opening 70 in the member M. FIG. 10 shows the clip nut 10 installed on the member M and a bolt B inserted through an opening 80 in member M' and threaded into the threaded opening 42 in the nut member 14.

As shown by FIGS. 6 and 9, the outer surfaces of the sidewalls 46, 48 widen as they extend downwardly from the tops of the sidewalls 46, 48 to the floor F of the nut recess 22. This makes the ear openings 50, 52 relatively long in the axial direction. It provides substantial surface area on the sides of the ear openings 50, 52 that confront the side edges of the ears 36, 38.

When the screw is inserted first through opening 32, then through opening 24, and then through opening 70 in the member M, and is then screwed into the threaded opening 42 in the nut member 12, an increase in the amount of torque will be applied to the nut member 14 as the screw is tightened. This torque will want to rotate the nut member 14 relative to the clip-body 12. This rotation will be resisted by contact between the leading edges of the ears 36, 38 and the side surfaces of the ear openings 50, 52 against which they may contact. The clip nut may be constructed so that there is also some contact between the end portions of the base 34 and the end walls 60, 62 and/or between the side edges of the base 34 and the sidewall surfaces 64, 66 on the inner sides of the ear walls 46, 48.

In preferred form, the arm 18 is made relatively thin. It is comparable in thickness to the thickness of the arm of a metal clip-body. According to an aspect of the invention, the arm 16 is made substantially thicker than arm 18. Also, arm 16 is made thicker than end wall 20 which itself is made substantially thicker than arm 18. When the bolt is tightened, torque is transmitted to the clip-body 12. Clip-body 12 wants to rotate about the center axis of the bolt relative to the member M. In a typical installation, the member M' rests on the arm 18 such that the arm 18 is firmly clamped between the members M, M'. As the bolt is tightened, the torque that it applies to the clip-body is carried by the arm 16 and the end wall 30, preventing breakage and minimizing twisting and distortion of the clip-body relative to arm 18 and the members M, M'.

Figure 2:
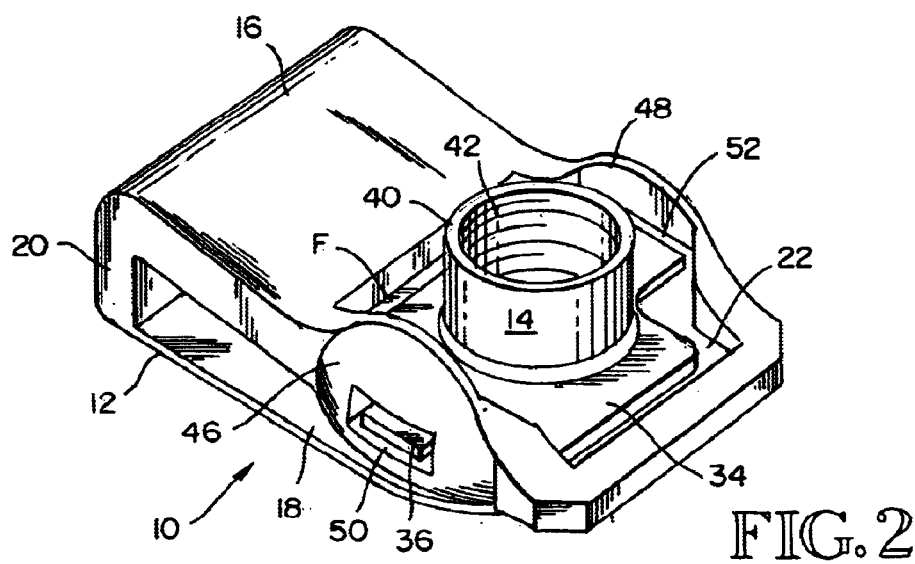
FIG. 2 is a view like FIG. 1, but showing the nut secured to the clip-body.

As best shown by FIGS. 1, 2 and 10, the side regions of the clip-body 12 are rounded both horizontally and vertically on the outsides of the sidewalls 46, 48. This creates vertical arches over the ear openings 50, 52 and horizontal arches below the ear openings 50, 52. This strengthens the clip-body 12 where strengthening is needed in order to resist the torque forces that are applied when the bolt is tightened.

It may be necessary for the two arms 16, 18 to spread apart somewhat or move together somewhat in response to tightening of the bolt in the nut 14. It has been found that the arm 16 and the end wall 20 will bend to the extent necessary for this adjustment to occur even though they are relatively thick. The thin arm 18 is clamped between member M', M and it won't move. The necessary movement for adjusting the clip body 12 to fit the installation occurs in the arm 16 and/or the end wall 20.

Another advantage of constructing the clip-body 12 from plastic is to make it relatively light. In an aircraft, for example, a clip nut 10 may be used at every location where it is desired to connect a member M' to a member M. In a single airplane, the number of clip nuts used may be in the thousands. If a small amount of weight is saved at each clip nut locations, the total weight saving can be substantial.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein.

What is claimed is:

1. A clip nut, comprising:

a one-piece, molded plastic, clip-body, including a first arm having first and second ends, a second arm having first and second ends, and an end-wall connecting the second end of the first arm to the second end of the second arm, and forming a closed first end for said clip-body, said clip-body having an opposite, second end that is open to receive a member between the first and second arms onto which the clip nut is mounted;

a pair of sidewalls on opposite sides of the first arm, extending outwardly from the first arm, said sidewalls including a first pair of substantially aligned ear openings;

said first arm including a nut-receiving space positioned laterally between the sidewalls, said space including a base surface;

a pair of substantially aligned bolt receiving openings in the first and second arms; wherein the bolt receiving opening in the first arm is surrounded by the base surface of the nut receiving space;

a nut having a base, a tubular body extending away from the base and including an internally threaded central opening, said base including a pair of opposite end edges, a pair of opposite side edges, and a pair of ears projecting outwardly from the side edges on diametrically opposite sides of said base;

wherein the base of the nut confronts the base surface of the nut-receiving space, between the sidewalls, and the ears on the nut extend outwardly into the ear openings; and wherein the base surface of the nut receiving space includes side portions which extend laterally outwardly through the ear openings;

wherein the first arm has a substantially constant thickness in its extent between the end wall and the base surface of the nut-receiving space; and wherein the end wall and the first arm are thicker than the second arm and are thick enough to carry torque forces that are applied to the clip nut when a bolt is tightened in the nut.

2. The clip nut of claim 1, wherein the second arm has inner and outer surfaces and a beveled edge at the open end of the clip-body that slopes upwardly and inwardly from the outer surface to the inner surface of the second arm.

3. The clip nut claim 2, wherein the bolt receiving opening in the second arm is at least partially surrounded by a tubular wall that projects from the inner surface of the second arm towards the first arm, said tubular wall having a sloping end portion directed outwardly through the open end of the clip-body, said end portion sloping upwardly and inwardly from the inner surface of the second arm.

4. The clip nut of claim 3, wherein the first arm has inner and outer surfaces and endwise an outwardly directed flare end portion at the open end of the clip-body.

5. The clip nut claim 1, wherein the ear openings are axially elongated and have side surfaces that confront side edges on said ears.

6. The clip nut of claim 1, wherein the nut receiving space is a well in the first arm that opens outwardly from the first arm and includes the base surface of the nut-receiving space and a pair of laterally extending end walls, said end walls forming a pair of laterally extending fences between which the base of the nut is situated.

7. A clip nut, comprising:

a one-piece, molded plastic, clip-body, formed from a plastic that is both strong and flexible, said clip body including a first arm having first and second ends, a second arm having first and second ends, and an end-wall connecting the second end of the first arm to the second end of the second arm, and farming a closed first end for said clip-body, said clip-body having an opposite, second end that is open to receive a member between the first and second arms onto which the clip nut is mounted;

a pair of sidewalls on opposite sides of the first arm, extending outwardly from the first arm;

said first arm including a nut-receiving space positioned laterally between the sidewalls, said space including a nut base confronting surface;

a pair of substantially aligned bolt receiving openings in the first and second arms; wherein the bolt receiving opening in the first arm is surrounded by the nut base confronting surface of the nut receiving space;

a nut having a nut base, a tubular body extending away from the base and including an internally threaded central opening, wherein the base of the nut confronts the nut base confronting surface of the nut-receiving space, between the sidewalls;

wherein the end wall and the first arm are thicker than the second arm and are thick enough and strong enough to carry torque forces that are applied to the clip nut when a bolt is tightened in the nut; and wherein the bolt receiving opening in the second arm is at least partially surrounded by a tubular wall that is a formed part of the second arm and projects from the inner surface of the second arm towards the first arm, said tubular wall having a sloping end portion directed outwardly through an open end of the clip-body, said end portion sloping upwardly and inwardly from the inner surface of the second arm.

8. The clip nut of claim 7, wherein the second arm has inner and outer surfaces and a beveled edge at the open end of the clip-body that slopes upwardly and inwardly from the outer surface to the inner surface of the second arm.

9. The clip nut of claim 7, wherein the molded plastic body is molded from an amide-imide plastics that is a reaction product of trimellitic anahydride and aromatic diamines.

* * * * *